United States Patent [19]
Myers

[11] 3,771,763
[45] Nov. 13, 1973

[54] BUTTERFLY VALVE WITH SIDE MOUNTED PRESSURE SEAL RING

[75] Inventor: Edward B. Myers, Oreland, Pa.

[73] Assignee: Honeywell Inc., Minneapolis, Minn.

[22] Filed: Apr. 4, 1972

[21] Appl. No.: 240,913

[52] U.S. Cl.................. 251/173, 251/152, 251/306
[51] Int. Cl............................................. F16k 1/22
[58] Field of Search................... 251/148, 151, 152, 251/173, 305, 306

[56] References Cited
UNITED STATES PATENTS

| | | | |
|---|---|---|---|
| 2,893,682 | 7/1959 | Hintzman et al. | 251/173 |
| 3,290,001 | 12/1966 | Taylor | 251/306 X |
| 3,601,360 | 8/1971 | Scaramucci | 251/151 X |
| 3,608,861 | 9/1971 | Helman et al. | 251/173 |

FOREIGN PATENTS OR APPLICATIONS

| | | | |
|---|---|---|---|
| 247,170 | 10/1960 | Australia | 251/305 |
| 1,006,377 | 9/1965 | Great Britain | 251/306 |
| 1,500,093 | 9/1965 | Germany | 251/305 |

*Primary Examiner*—William R. Cline
*Attorney*—Arthur H. Swanson et al.

[57] ABSTRACT

An improvement in a readily replaceable disc seal for a butterfly valve includes a hollow body supporting a rotatable disc, which body can readily be inserted in or removed from a position between two opposing ends of a conduit. An inner portion of the disc seal has an annular triangular shaped lip portion extending away from an inclined side wall portion of the body to form a wedge shaped recess therewith. When the disc is in a closed position, the pressure of a flow line fluid on the non sealing side of the valve is applied by way of a restricted passageway, formed between the periphery of the disc and the body, to the wedge shaped recess to force the lip of the disc seal into fluid tight sealing contact with an outer edge portion of the periphery of the disc.

7 Claims, 5 Drawing Figures

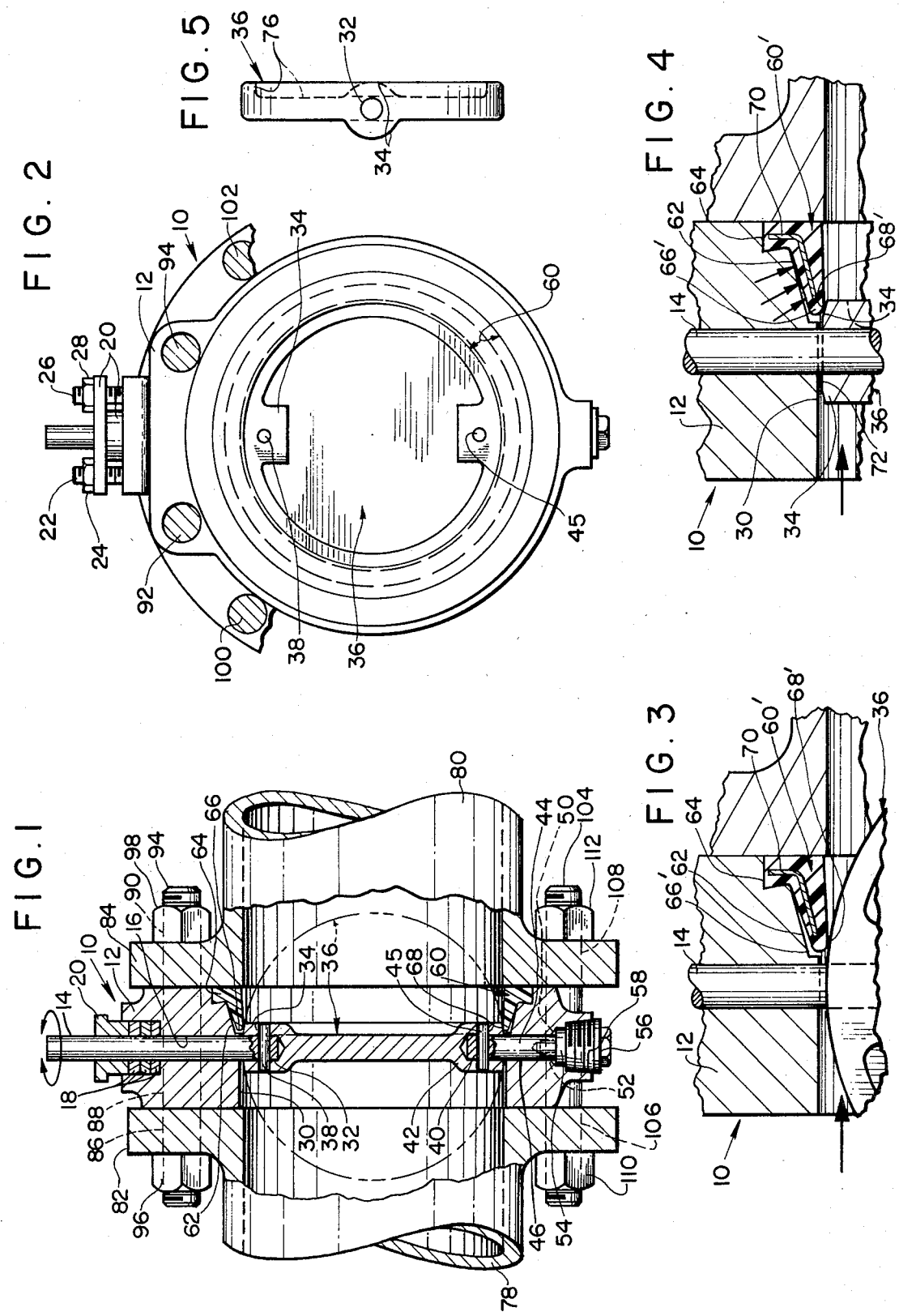

BUTTERFLY VALVE WITH SIDE MOUNTED PRESSURE SEAL RING

BACKGROUND OF THE INVENTION

Butterfly valves of the aforementioned type can be readily inserted between two spaced apart flanges that form a part of a flow conduit and fixedly retained in this position by passing bolts through these flanges and apertures formed in the body of the butterfly valve.

PROBLEMS

Prior to the present invention other various types of butterfly valves have been used, for example, the type in which a seal ring is formed on the outer edge of the disc and which when rotated is brought into engagement with an annular seat formed by a body portion of the valve.

In order to replace the seal ring contained by these valves it has heretofore been necessary to remove the entire valve body, the disc and its associated seal ring contained therein as a unit from the flow conduit in which it is mounted and to then remove the disc and seal ring through an opening in the body of the valve. Only in this laborious way has an operator been able to procure access to the seal ring in order to remove and replace it with a new ring.

Another problem encountered with present butterfly valves is that the flexible seal rings must be held in a non-removable position on the disc by using a suitable seal ring retaining means such as a retainer ring that is connected to the disc by means of screw connections.

Another problem is that it is laborious to remove and then replace the many screw connections that are required to hold the retainer ring against the seal when a new seal ring is required, particularly, when the disc is a foot or more in diameter.

Still another problem is that undesired turbulent fluid flows are introduced into the flowing stream of fluid when a flow of fluid is forced into engagement with the protruding edges of the aforementioned metal retaining rings that are employed to hold the seal ring on the disc.

Still another problem encountered with present day butterfly valves is that since their seal rings do not provide substantially fluid tight joints between the disc and inner wall of the body, fluid leakage past the disc has become a major problem for which no solution has been found to date.

SUMMARY OF THE INVENTION

A butterfly valve is provided with a ring seal that is of a boot shaped cross section. Such a seal can be readily inserted and removed from a grooved out annular wall portion formed in a side wall of the valve body so that it can be easily replaced with another ring seal without requiring all the valve parts to be disassemblied from its body.

The unique butterfly valve to be hereinafter described is readily retained in its aforementioned assembled seal position by means of flanges that form two sections of a flow line between which, sides of the body of the valve are inserted and retained by means of bolts and nut connections.

The space formed between the boot like construction of the ring seal and the characterized annular construction of the groove in the side of the body into which the seal is inserted enables the fluid on the high pressure side of the valve when it is closed to retain the seal ring in good fluid tight engagement with the outer peripheral of the disc. Such a construction thereby substantially eliminates undesired leaks which have heretofore occurred when other previously mentioned types of butterfly valves have been used.

BRIEF DESCRIPTION OF THE DRAWINGS

A better understanding of the present invention may be had when the following detailed description is read in connection with the accompanying drawings in which:

FIG. 1 is a partial cross sectional side elevational view of the butterfly valve showing how it is mounted in a flow conduct;

FIG. 2 is an end elevational view of the butterfly valve of FIG. 1 showing the disc and ring seal in a closed position;

FIG. 3 is a partial section of a butterfly valve seal similar to FIG. 1 but which is reinforced and further shows the valve in a fully open position;

FIG. 4 is a partial section of a butterfly valve seal similar to FIG. 1 but which is reinforced and further shows the valve in a fully closed position and FIG. 5 is a top plane view of the butterfly valve disc per se.

FIG. 1 shows that the butterfly valve 10 has a body 12 and a stem 14 passing through a cylindrical aperatured wall 16 in the body 12. The stem 14 is also shown passing through a stack of packing rings 18. FIG. 2 shows how the packing rings 18 of FIG. 1 are held in fluid tight pressure engagement with the stem 14 in a conventional manner by means of a gland 20 and a pair of stud and bolt connections 22, 24; 26, 28.

A wall 30 forms a cylindrical passageway in the left portion of the body 12. A stem 14 is shown protruding into a bored out wall portion 32 in a boss portion 34 in the top of disc 36.

FIGS. 1 and 2 show the stem 14 connected to disc 36 by means of a pin connection 38 that is in pressed fit engagement with this disc 36.

The lower end of the disc 36 has another bored out wall portion 40 formed in a second boss portion 42 of this disc 36. A pivot pin 44 is shown in FIG. 1 protruding into the wall portion 40 of the disc 36 and is held in fixed engagement therewith by means of a pin connection 45 that is in pressed fit engagement with the embossed portion 42 and pivot pin 44. The lower end of the pivot pin 44 passes through a bored out wall portion 46 having a counter sunk end 50 in the lower part of the valve body 12 in a conventional manner.

A bored out internally threaded wall 52 is formed in the lower central portion of the pin 44. A bored out wall portion 54 is also shown forming a chamber that is immediately under the lower end of the pin 44. A standard pipe plug 56 is threadedly connected at 58 to the lower end of the valve body 12.

When it is desired to remove the pin 44, after the valve 10 has been removed from its flow conduit 78, 80 which is shown in FIG. 1, the pin 45 and pipe plug 56 are removed and a threaded pull rod, not shown, is threadedly engaged with the threads forming the threaded wall 52 in the pin 44 so that a force can be exerted on the pin 44 to remove same in an outward direction from the valve body 12.

FIG. 1 shows a ring seal 60 that is of a resilient boot shaped cross section inserted in annular grooved out portions 62, 64 formed in the body 12 of the butterfly valve 10.

It can be seen that the left tapered end portion 66 of the boot shaped seal 60 is retained in contact with the right side of the top portion of the embossed part of the disc 36 as well as the remaining peripheral portion of the disc 36. This is accomplished by constructing the ring seal in the manner shown so that the pressure of a fluid acting on the left or high pressure side of the valve 10 can be applied between the annular body surface 62 and the top of the annular tapered seal portion 66 to force the lower annular surface portion 68 of the ring seal 60 into good fluid tight engagement with the outer peripheral portion of the disc 36.

FIG. 3 shows a resilient ring seal 60' which is similar to the ring 60 shown in FIG. 1 but with the addition of a metal part 70 to give the ring additional strength when the ring is employed to shut off fluids, particularly fluids which extend into the high pressure ranges.

This resilient seal 70 is made of a more rigid material than the material from which the resilient ring 60' is made and forms a stiffening member inside this resilient ring 60' which is of a molded construction.

When the butterfly valve disc 36 and its associated stem 14 is rotated between the open, or FIG. 3 position, to the closed, or FIG. 4 position, it can be seen that the fluid under pressure will then be allowed to flow from the left side of the butterfly valve 10 the direction of the arrow through the restricted space formed between the top surface 72 of the boss portion 34 and the wall surface 30. The pressure of this fluid is also applied about the remaining periphery of disc 36 and to the wedge shaped recess formed by the tapered surface 62 of the body and the outer surface of the triangular shaped end portion 66' of the boot shaped seal 60'. When disc 36 is closed, this action will force the inner annular surface portion 68' of the ring seal 60' in the direction of the arrows into good fluid tight engagement with the outer peripheral portion of the disc 36.

As is best shown in FIGS. 1 and 5 the inner right side of the disc 36 has a cup shaped surface 76 to enable the stem 14 to be rotated in a clockwise or counterclockwise direction as shown by the arrows with the least amount of force as the fluid under pressure is flowing in the direction of the arrows through the conduits 78, 80.

FIGS. 1 and 2 show the aforementioned butterfly valve 10 inserted between a flange 82 forming an integral part of the conduit 78 and a flange 84 forming an integral part of the conduit 80. Aligned bored out wall portions 86, 88, 90 are formed in flange 82, valve body 12 and flange 84. Tie bolts 92, 94 are then passed through these aligned bored out wall portions 86, 88, 90 and a pair of threaded nut connections, for example, 96, 98 are applied to the ends of each of these bolts 92, 94 to retain the flanges 82, 84 and body 12 in fluid tight engagement with one another.

A suitable number of additional tie bolts for example, 100, 102, 104 are also employed, which pass through the bored out wall portions for example 106, 108 in the flanges 82, 84 along with associated threaded nut connections for example 110, 112 to fixedly mount other body portions of the butterfly valve 10 between these flanges 82, 84.

It can be seen from the aforementioned description of the butterfly valve 10 that a seal 60 or 60' has been provided that can readily be removed from and another inserted in the right side of its body 12. This removal of the old ring seal 60 or 60' can be readily accomplished whenever the valve 10 has been removed from its position between the flanges 82, 84. In some cases it may be possible to move one of the flanges 84 and its associated conduit 80 away from the right side of the valve body 12 after the nuts 98, 112 etc. are removed from their assemblied tie bolts 94, 104. In this latter case the old ring seal 60 or 60' can be replaced with a new ring seal without removing the valve 10 from the lines 78, 80 by merely retaining the conduit 80 in the aforementioned sprung part position with respect to the right side of the butterfly valve 10. With the valve 10 in this position, the seal ring can be removed from its position in the right side of the valve body 12 by moving it to the right of the position shown in FIG. 1 and then outward through the space formed between the right side surface of the body of the valve 10 and the flange 84.

A new ring gasket can then be inserted into the same position as that shown in FIG. 1 by merely following the reverse procedure of that just described.

It should also be noted that the ring seal 60 or 60' further provides a fluid tight seal between the right side of the body 12 and the left side of the flow line flange 84. Such a seal will therefore eliminate the need for a separate gasket being inserted between the aforementioned side parts of the flange and valve body.

The embodiments of the invention in which an exclusive property or privilege is claimed are defined as follows:

1. A butterfly valve, comprising a unitary sleeve shaped body having an annular recess in one side wall thereof that is immediately adjacent the inner wall of said sleeve, an outer annular portion of said recess being of a V-shaped cross section, another annular portion of said recess having a tapered surface that extends away from said first mentioned annular portion, a resilient ring seal having an outer annular wedge shaped portion positioned in engagement with said annular V-shaped recess in said body, said resilient ring seal further having an annular lip portion of triangular shaped cross section extending into the sleeve from its said wedge shaped wall portion, said tapered surface and said annular lip of said resilient ring being positioned to form a wedge shaped recess, a disc rotatably mounted in said sleeve for movement from an open position in which only a peripheral portion adjacent a top and bottom portion of said disc is retined in physical contact with said inner annular lip portion of said seal to a closed position in which substantially the entire outer peripheral surface of said disc that is adjacent the sealing side of the disc is brought into physical contact with said inner annular lip portion of said ring seal.

2. The butterfly valve as defined in claim 1 wherein said triangular shaped annular lip portion of said ring seal is positioned to extend in a direction toward another opposite side of said body.

3. The butterfly valve as defined in claim 1 wherein said triangular shaped annular lip portion of said ring seal is positioned to extend in a direction toward another opposite side of said body and wherein said wedge shaped recess between said tapered surface, and said triangular shaped annular lip provides an area against which a fluid acting on the non-sealing side of said disc can be applied to press the triangular shaped lip portion of said seal into fluid tight engagement with the entire outer periphery of said disc when the disc has been moved to a closed position.

4. The butterfly valve as defined in claim 1 wherein the cross section of said resilient ring seal is of a substantially boot shaped configuration and wherein the toe end of said boot forming said ring seal is said annular lip of the seal that is of said triangular shape configuraiton and wherein said annular outer wedge shaped surface of said ring seal is adapted to be retained in said annular V-shaped wall of said body by the side of a flange forming a part of a flow conduit in which the valve body is mounted.

5. The butterfly valve as defined in claim 1 wherein a ring that is of a more rigid material than said resilient ring extends through the central portion of said wedge shaped and triangular shaped annular lip portions of said resilient ring.

6. The butterfly valve as defined in claim 1 wherein the side of said disc that contains the peripheral portion that is brought into physical contact with the seal ring is of a dish-shaped configuration and the other side of said disc has a substantially flat surface.

7. The butterfly valve as defined in claim 1 wherein said triangular shaped annular lip portion of said ring seal is positioned to extend toward an opposite side of said body, said wedge shaped recess formed between said tapered surface and said triangular shaped annular lip portion being positioned to provide a surface against which a fluid acting on the non-sealing side of said disc can be directly applied to press the said triangular shaped lip portion into fluid tight engagement with substantially the entire outer periphery of said disc when the disc has been moved to a closed position and wherein the outer periphery of said disc and the inner surface of said sleeve shaped body being juxta positioned with respect to one another to form a restricted passageway through which said fluid on the non-sealing side of said disc is applied to said seal.

* * * * *